(12) United States Patent
Kubota et al.

(10) Patent No.: US 9,760,165 B2
(45) Date of Patent: Sep. 12, 2017

(54) MOBILE TERMINAL DEVICE AND INPUT OPERATION RECEIVING METHOD FOR SWITCHING INPUT METHODS

(71) Applicant: KYOCERA Corporation, Kyoto-shi, Kyoto (JP)

(72) Inventors: Saki Kubota, Daito (JP); Atsutaka Saiki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 122 days.

(21) Appl. No.: 14/696,303

(22) Filed: Apr. 24, 2015

(65) Prior Publication Data

US 2015/0227194 A1   Aug. 13, 2015

Related U.S. Application Data

(63) Continuation of application No. PCT/JP2013/078525, filed on Oct. 22, 2013.

(30) Foreign Application Priority Data

Oct. 25, 2012  (JP) .................................. 2012-236071

(51) Int. Cl.
  *G06F 3/01*   (2006.01)
  *G06F 3/0488*  (2013.01)
  *G06F 3/16*   (2006.01)

(52) U.S. Cl.
  CPC ............... *G06F 3/01* (2013.01); *G06F 3/013* (2013.01); *G06F 3/017* (2013.01); *G06F 3/04883* (2013.01); *G06F 3/167* (2013.01); *G06F 2203/0381* (2013.01)

(58) Field of Classification Search
  CPC .  G06F 3/01; G06F 3/013; G06F 3/017; G06F 3/167; G06F 3/04883; G06F 2203/0381
  See application file for complete search history.

(56) References Cited

U.S. PATENT DOCUMENTS

| 4,158,750 | A | | 6/1979 | Sakoe et al. |
| 4,449,238 | A | * | 5/1984 | Lee .......................... H04N 7/15 348/14.08 |
| 2009/0268032 | A1 | * | 10/2009 | Jones ...................... H04N 7/183 348/164 |

(Continued)

FOREIGN PATENT DOCUMENTS

| JP | 52-147002 A | 12/1977 |
| JP | S59-124399 | 7/1984 |

(Continued)

OTHER PUBLICATIONS

International Search Report dated Jan. 14, 2014 issued in counterpart International Application No. PCT/JP2013/078525.

(Continued)

*Primary Examiner* — Larry Sternbane
(74) *Attorney, Agent, or Firm* — Procopio Cory Hargreaves and Savitch LLP

(57) ABSTRACT

Mobile terminal device and method for switching inputs methods. In an embodiment, a mobile terminal device switches between two or more different input methods upon satisfaction of a switching condition, which indicates that input detection via the current input mode is difficult.

15 Claims, 10 Drawing Sheets

(56) References Cited

U.S. PATENT DOCUMENTS

| | | | | |
|---|---|---|---|---|
| 2010/0222098 A1* | 9/2010 | Garg | ............... | H04M 1/72552 455/556.1 |
| 2010/0281341 A1* | 11/2010 | Wu | ............... | H03M 13/2909 714/763 |
| 2012/0092284 A1* | 4/2012 | Rofougaran | ............ | G06F 3/017 345/173 |
| 2012/0124511 A1 | 5/2012 | Kawakami | | |
| 2012/0127520 A1* | 5/2012 | Shimao | ............... | G06F 3/0418 358/1.15 |
| 2012/0256085 A1* | 10/2012 | Otten | ............... | H01J 37/244 250/307 |
| 2013/0311925 A1* | 11/2013 | Denker | ............... | G06F 3/013 715/771 |
| 2014/0298189 A1 | 10/2014 | Kawakami | | |

FOREIGN PATENT DOCUMENTS

| | | | | |
|---|---|---|---|---|
| JP | 07-219583 A | 8/1995 | | |
| JP | H11-338120 A | 12/1999 | | |
| JP | 2002-033820 A | 1/2002 | | |
| JP | 2003-029785 A | 1/2003 | | |
| JP | 2005-115773 A | 4/2005 | | |
| JP | 2009-251658 A | 10/2009 | | |
| JP | 2009251658 A | * 10/2009 | ............... | G06F 3/01 |
| JP | 2011-081541 A | 4/2011 | | |
| JP | 2012-103951 A | 5/2012 | | |

OTHER PUBLICATIONS

Decision of Refusal of the Japanese Patent Office on Application No. JP2012-236071 issued on Jul. 26, 2016.

Written Opinion of the International Searching Authority issued by Japan Patent Office for International Application PCT/JP2013/078525.

Notification of Reasons for Refusal issued on Apr. 12, 2016 by the Japan Patent Office for counterpart Japanese Patent Application No. 2012-236071.

* cited by examiner

FIG. 3

CORRESPONDENCE TABLE

| APPLICATION | INPUT METHOD |
|---|---|
| APPLICATION A | TOUCH INPUT |
| SOUND RECOGNITION | SOUND INPUT |
| APPLICATION B | TOUCH INPUT |
| ELECTRONIC BOOK | LINE-OF-SIGHT INPUT |
| GALLERY | GESTURE INPUT |
| APPLICATION E | TOUCH INPUT |
| APPLICATION C | LINE-OF-SIGHT INPUT |
| APPLICATION D | GESTURE INPUT |
| ...... | ...... |

12a

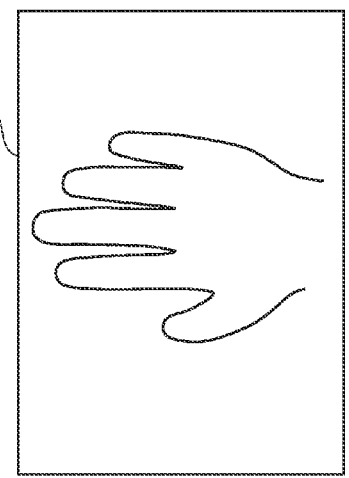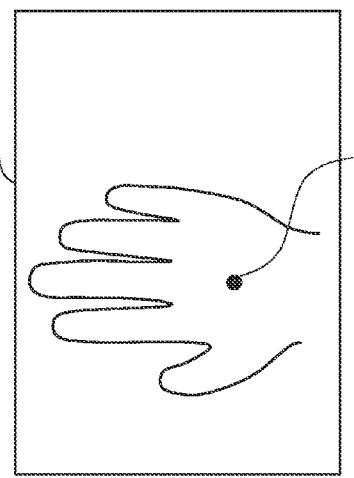
FIG. 4A
FIG. 4B

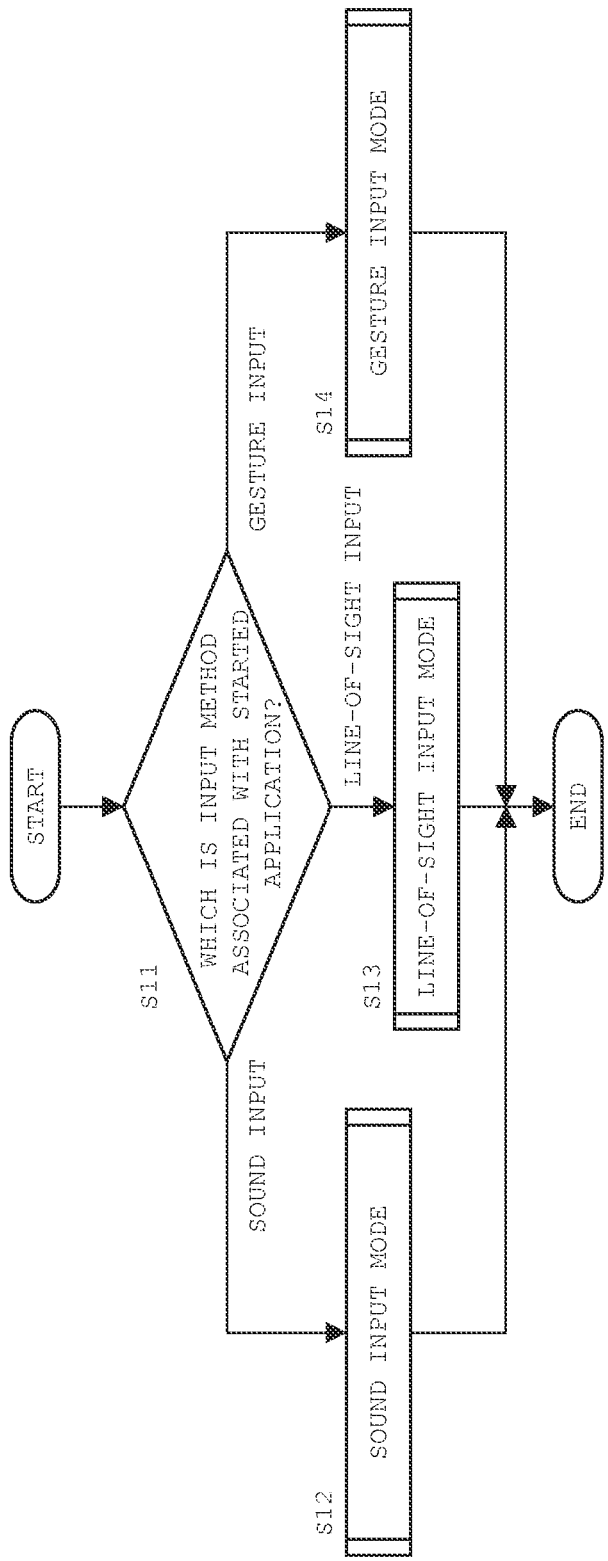

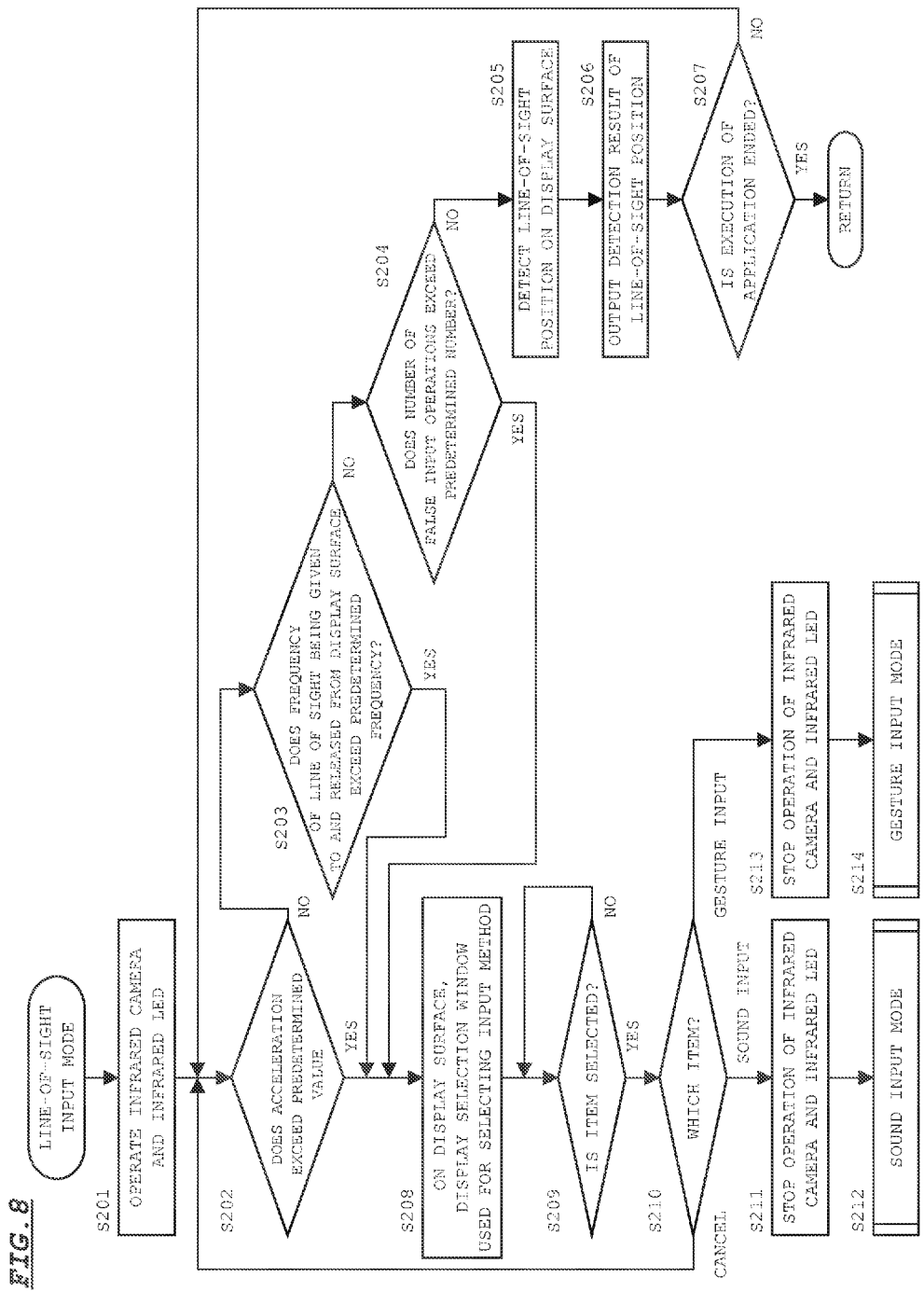

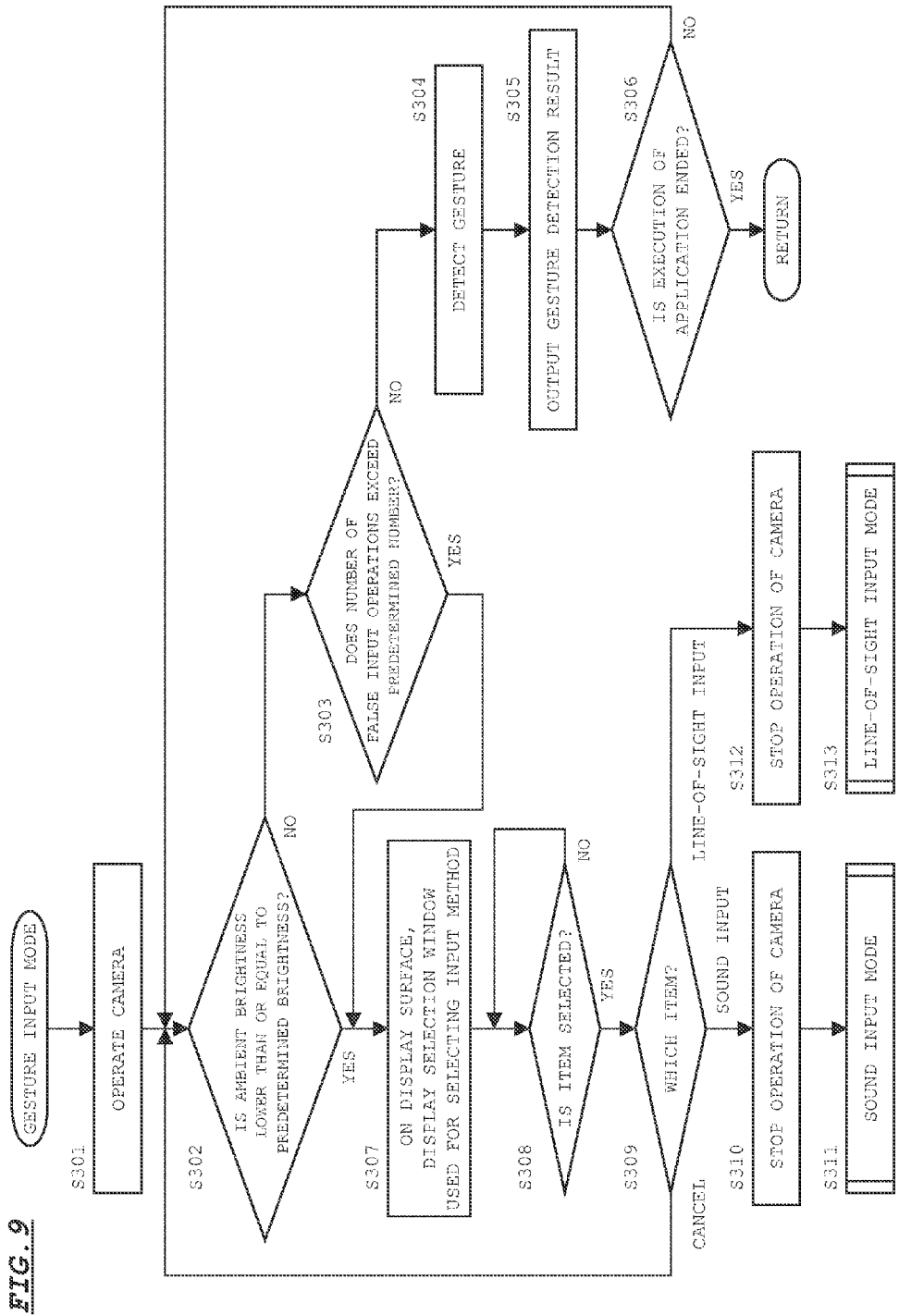

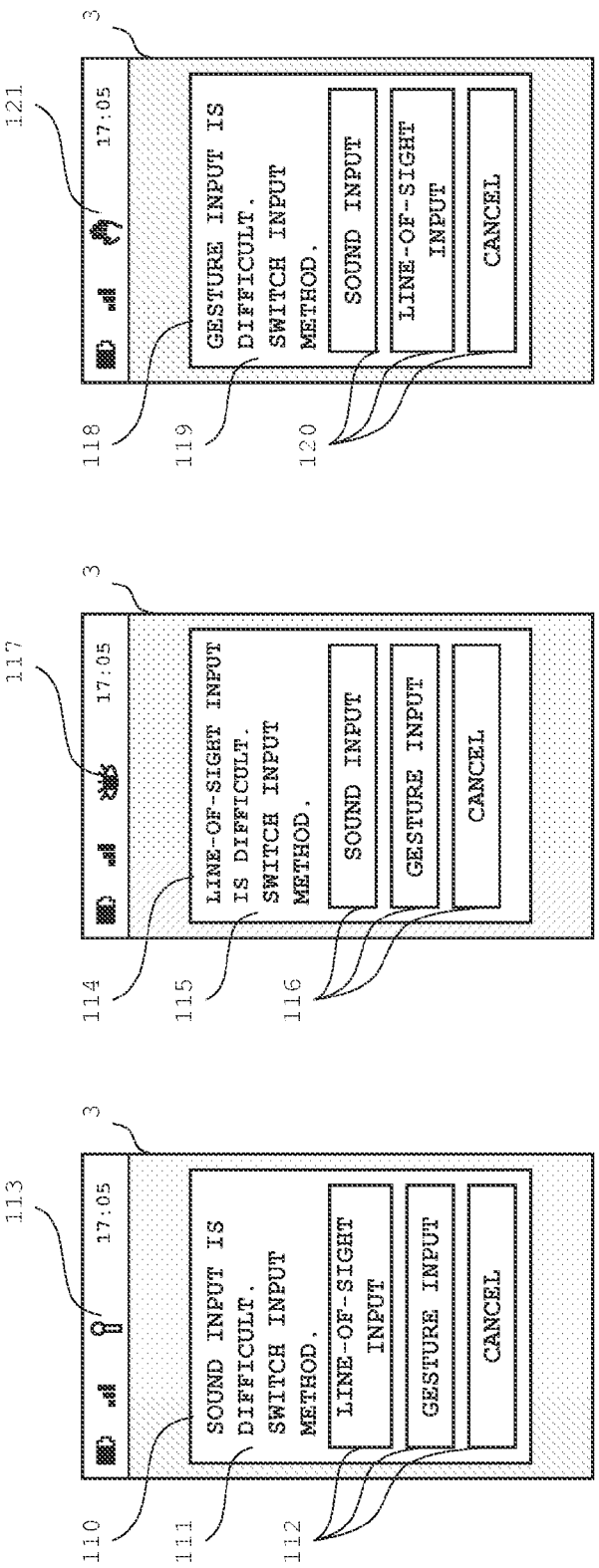

MOBILE TERMINAL DEVICE AND INPUT OPERATION RECEIVING METHOD FOR SWITCHING INPUT METHODS

This application claims priority under 35 U.S.C. Section 119 of Japanese Patent Application No. 2012-236071 filed Oct. 25, 2012, entitled "PORTABLE TERMINAL DEVICE, PROGRAM AND INPUT OPERATION ACCEPTING METHOD". The disclosure of the above application is incorporated herein by reference.

FIELD

Embodiments of the present disclosure relates to a mobile terminal device such as a mobile phone, a PDA (Personal Digital Assistant), a tablet PC, or an electronic book terminal. Embodiments of the present disclosure also relates to an input operation receiving method. The input operation receiving method is for use in the mobile terminal device, for example.

BACKGROUND

Currently, in a mobile terminal device such as a mobile phone, various input methods can be employed in addition to a touch input operation. For example, the input methods include an input operation with a user's voice (hereinafter referred to as "sound input") and an input operation with a gesture using a user's hand or the like (hereinafter referred to as "gesture input").

SUMMARY

A first aspect of the disclosure relates to a mobile terminal device. The mobile terminal device includes a first operation receiving module configured to receive a first input operation, a second operation receiving module configured to receive a second input operation having a method different from that of the first input operation, a determination module configured to determine whether or not the switch condition is satisfied which indicates that the reception of the first input operation by the first operation receiving module is difficult, and a switch control module configured to, based on a determination that the switch condition is satisfied by the determination module, switch first mode of receiving the first input operation by the first operation receiving module to second mode of receiving the second input operation by the second operation receiving module.

A second aspect of the disclosure relates to an input operation receiving method. The input operation receiving method according to the second aspect includes determining whether or not the switch condition is satisfied that indicates the difficulty of the reception of the first input operation; and, based on a determination that the switch condition is satisfied, switching first mode of receiving the first input operation to second mode of receiving a second input operation having a method different from that of the first input operation.

BRIEF DESCRIPTION OF THE DRAWINGS

These and other objects, and novel features of the present disclosure will become more apparent upon reading the following detailed description of the embodiments along with the accompanying drawings.

FIG. 3 is a diagram showing the configuration of a correspondence table in an embodiment;

FIG. 4A and FIG. 4B are diagrams for describing the detection of a gesture by a gesture detection module in an embodiment;

FIG. 6 is a flowchart showing an input operation receiving processing in an embodiment;

FIG. 8 is a flowchart showing the processing of line-of-sight input mode included in the input operation receiving processing in an embodiment;

FIG. 9 is a flowchart showing the processing of gesture input mode included in the input operation receiving processing in an embodiment;

FIG. 10A to FIG. 10C are diagrams showing selection windows displayed on a display surface in the sound input mode, line-of-sight input mode, and gesture input mode in an embodiment.

The drawings are provided mainly for description, and do not limit the scope of the present disclosure.

DESCRIPTION OF PREFERRED EMBODIMENTS

Hereinafter, an embodiment of the disclosure is described with reference to the accompanying drawings.

Figure 1B:
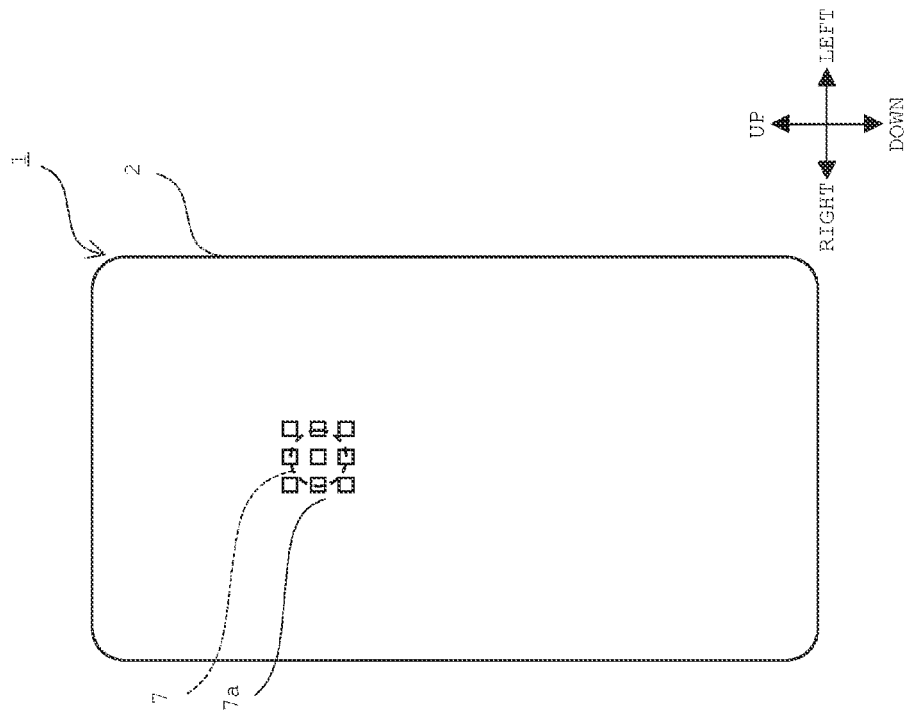
FIG. 1A and FIG. 1B are diagrams showing a configuration of a mobile phone in an embodiment.
Figure 1A:
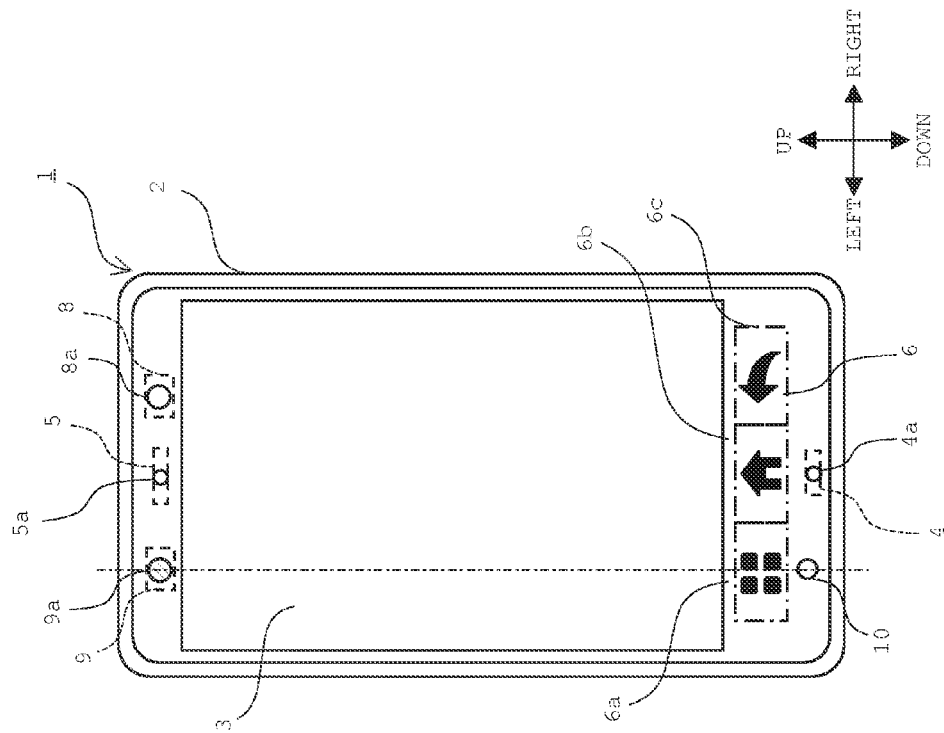

FIG. 1A and FIG. 1B are diagrams showing a configuration of a mobile phone 1. FIG. 1A and FIG. 1B are a front view and a rear view of the mobile phone 1, respectively.

Hereinafter, to simplify the description, as shown in FIG. 1A and FIG. 1B, a long side direction of a cabinet 2 is defined as a longitudinal direction, and a short side direction of the cabinet 2 is defined as a lateral direction.

The mobile phone 1 may include the cabinet 2, a display surface 3, a microphone 4, a call speaker 5, a key operation part 6, an external speaker 7, a camera 8, an infrared camera 9, and an infrared LED (light emitting diode) 10.

The cabinet 2 may have a substantially rectangular contour when viewed from the front side. The display surface 3 of a display module 13 to be described later may be disposed on the front surface of the cabinet 2. Various images (screens) are displayed on the display surface 3.

The microphone 4 may be disposed at a lower end inside the cabinet 2, and the call speaker 5 may be disposed at an upper end inside the cabinet 2. The microphone 4 receives a sound through a microphone hole 4a formed in the front surface of the cabinet 2. The microphone 4 generates an electrical signal in accordance with the input sound. A sound is output from the call speaker 5. The output sound is released to the outside through an output hole 5a formed in the front surface of the cabinet 2.

The key operation part 6 may be disposed on the front surface of the cabinet 2. The key operation part 6 may be provided with a setting key 6a, a home key 6b, and a back key 6c. The setting key 6a is a key mainly for making a setting screen for various settings be displayed on the display surface 3. The home key 6b is a key mainly for making a home screen be displayed on the display surface 3. The back key 6c is a key mainly for returning an executed process to a previous process by one step.

The external speaker 7 may be disposed in the cabinet 2. Output holes 7a corresponding to the external speaker 7 are formed in the back surface of the cabinet 2. A sound (a voice, an alarm, or the like) output from the external speaker 7 is released to the outside through the output holes 7a.

The camera 8 may be disposed to the immediate right of the call speaker 5. A lens window 8a is disposed in the front surface of the cabinet 2, and an image of a subject is taken into the camera 8 through the lens window 8a.

The infrared camera 9 may be disposed to the immediate left of the call speaker 5. A lens window 9a is disposed in the front surface of the cabinet 2, and an image of a subject is taken into the infrared camera 9 through the lens window 9a.

The infrared LED 10 for emitting infrared light may be disposed to the immediate left of the microphone 4. The light emitting surface of the infrared LED 10 is exposed to the outside. The infrared LED 10 may be disposed at the same position as the infrared camera 9 in the lateral direction of the cabinet 2.

Figure 2:
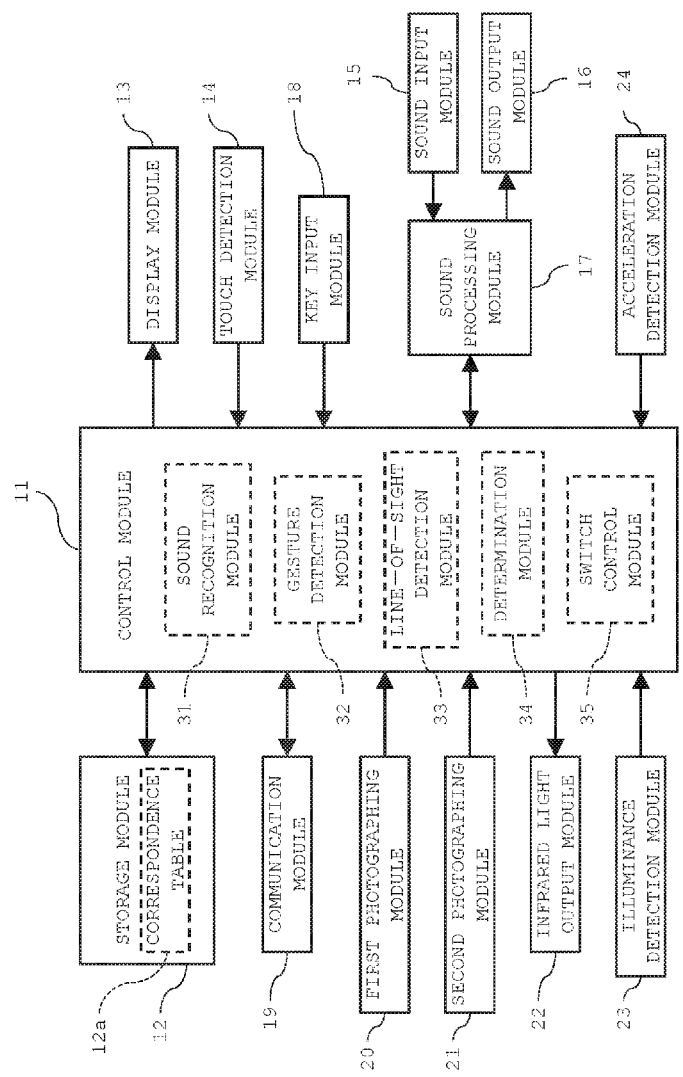
FIG. 2 is a block diagram of the entire configuration of the mobile phone in an embodiment.

FIG. 2 is a block diagram showing the entire configuration of the mobile phone 1. The mobile phone 1 may include a control module 11, a storage module 12, the display module 13, a touch detection module 14, a sound input module 15, a sound output module 16, a sound processing module 17, a key input module 18, a communication module 19, a first photographing module 20, a second photographing module 21, an infrared light output module 22, an illuminance detection module 23, and an acceleration detection module 24.

The storage module 12 may include an ROM, an RAM, an external memory, and the like. The storage module 12 stores various programs. The programs stored in the storage module 12 include, in addition to a control program for controlling the modules of the mobile phone 1, various applications (for example, a phone, an email, a phonebook, a map, a game, schedule management, sound recognition, an electronic book, and a gallery). The programs are stored in the storage module 12 when the mobile phone 1 is manufactured by the manufacturer, or are stored in the storage module 12 by the user via a communication network or a storage medium.

The storage module 12 also may include a working area (not illustrated) for storing the data temporarily used or generated when a program is executed.

A correspondence table 12a shown in FIG. 3 is stored in the storage module 12. In the correspondence table 12a, the applications mounted in the mobile phone 1 and the input methods when the applications are executed are registered. The mobile phone 1 of the present embodiment can perform, in addition to a touch input operation (touch input) to a touch panel, an input operation with a sound (sound input), an input operation with a line of sight(line-of-sight input), and an input operation with a gesture(gesture input).

The control module 11 may include a CPU and the like. The control module 11 controls the modules constituting the mobile phone 1 (such as the storage module 12, the display module 13, the touch detection module 14, the sound input module 15, the sound output module 16, the sound processing module 17, the key input module 18, the communication module 19, the first photographing module 20, the second photographing module 21, the infrared light output module 22, the illuminance detection module 23, and the acceleration detection module 24) in accordance with the programs.

The display module 13 may include a liquid crystal display and the like. The display module 13 displays an image (a screen) on the display surface 3, based on a control signal and an image signal sent from the control module 11. The display module 13 may include with another display device such as an organic EL display, instead of the liquid crystal display.

The touch detection module 14 may include a touch panel and the like configured to detect a touch to the display surface 3 by a fingertip. The touch panel may be formed in a transparent sheet shape, and may be disposed on the front surface of the cabinet 2 so as to cover the display surface 3. The touch panel may be any one of various types of touch panels such as an electrostatic capacitive touch panel, an ultrasonic touch panel, a pressure sensitive touch panel, a resistance film touch panel, and a photosensitive touch panel.

The touch detection module 14 receives a user's touch input operation to the display surface 3. Specifically, the touch detection module 14 detects a touch position on the display surface 3 which the fingertip has touched, and outputs, to the control module 11, a position signal corresponding to the detected touch position.

The user can perform various touch operations by touching the display surface 3 with the fingertip. Examples of the touch input operations are a tap operation, a flick operation, and a slide operation. The tap operation is an operation of touching the display surface 3 with the fingertip and releasing the fingertip from the display surface 3 within a short time. The flick operation is an operation of flipping the display surface 3 in any direction with the fingertip. The slide operation is an operation of moving the fingertip on the display surface 3 in any direction while keeping the fingertip in contact with the display surface 3. The flick operation and the slide operation are touch operations accompanying a movement of the touch position.

The touch input operations are described more specifically. For instance, after a touch position on the display surface 3 is detected by the touch detection module 14, when the touch position cannot be detected any more within a predetermined first time, the control module 11 determines that a tap operation has been performed. After a touch position on the display surface 3 is detected by the touch detection module 14 and the touch position is moved by a predetermined first distance or more within a predetermined second time, when the touch position cannot be detected any more, the control module 11 determines that a flick operation has been performed. After a touch position on the display surface 3 is detected by the touch detection module 14, when the touch position is moved by a predetermined second distance or more, the control module 11 determines that a slide operation has been performed.

The sound input module 15 may include the microphone 4 and the like. The sound input module 15 outputs an electrical signal from the microphone 4 to the sound processing module 17.

The sound output module 16 may include the call speaker 5 and the external speaker 7. The sound output module 16 receives an electrical signal from the sound processing module 17, and outputs a sound (a voice, an alarm, or the like) from the call speaker 5 or the external speaker 7.

The sound processing module 17 applies A/D conversion or the like to an electrical signal from the sound input module 15, and outputs, to the control module 11, a digital sound signal having undergone the A/D conversion. The sound processing module 17 applies a decoding processing and D/A conversion to the digital sound signal output from the control module 11, and outputs, to the sound output module 16, an electrical signal having undergone the D/A conversion.

When each operation key in the key operation part 6 is pressed, the key input module 18 outputs, to the control module 11, a signal corresponding to the pressed operation key.

In order to make a phone call or perform communication, the communication module 19 may include a circuit for converting a signal and an antenna for transmitting and receiving a radio wave. The communication module 19 converts, into a wireless signal, a signal for a phone call or communication that is input from the control module 11, and transmits the converted wireless signal to a communication destination such as a base station or another communication device via the antenna. Further, the communication module 19 converts the wireless signal received via the antenna into a signal of a format usable by the control module 11, and outputs the converted signal to the control module 11.

The first photographing module 20 may include the camera 8 and the like. The first photographing module 20 applies various image processing to the image data of an image photographed by the camera 8, and outputs, to the control module 11, the image data having undergone the image processing.

The second photographing module 21 may include the infrared camera 9 and the like. The second photographing module 21 applies image processing to the image data of an image photographed by the infrared camera 9, and outputs monochrome image data to the control module 11.

The infrared light output module 22 may include the infrared LED 10, an LED drive circuit and the like. The LED drive circuit drives the infrared LED 10 in response to a control signal from the control module 11.

The illuminance detection module 23 may include an illuminance sensor and the like, and detects the ambient brightness. A detection signal corresponding to the ambient brightness is output from the illuminance sensor, and is input to the control module 11.

The acceleration detection module 24 may include an acceleration sensor and the like, and detects the acceleration occurring in the mobile phone 1. The acceleration sensor outputs a detection signal corresponding to the acceleration occurring in the mobile phone 1, and inputs the detection signal to the control module 11.

In the present embodiment, an input operation receiving processing is executed in accordance with the program for this processing stored in the storage module 12. The control module 11 executes a predetermined processing based on an input operation received in the input operation receiving processing. The predetermined processing includes a start of various applications, an input of various pieces of information such as text information, and an update of display of a screen on the display surface 3.

In the input operation receiving processing, processing of each of the sound input mode of receiving a sound input, the line-of-sight input mode of receiving a line-of-sight input, and the gesture input mode of receiving a gesture input is executed in accordance with the input method associated with an executed application. Furthermore, in each input mode, it is determined whether or not a switch condition is satisfied that indicates the difficulty of the reception of the input operation (sound input, line-of-sight input, and gesture input). When the input operation is determined to be difficult, the present input mode is switched to the input mode of another input method.

In order to execute the input operation receiving processing, the control module 11 may include a sound recognition module 31, a gesture detection module 32, a line-of-sight detection module 33, a determination module 34, and a switch control module 35.

The sound recognition module 31 executes a sound recognition processing using a sound signal input from the sound processing module 17, and outputs text information including a sound in a text format.

The gesture detection module 32 detects a user's gesture on the basis of the image photographed by the first photographing module 20 (camera 8). In the present embodiment, a gesture performed by a user's hand is detected.

The gesture detection module 32 detects, from the image photographed by the camera 8, an image of the hand on the basis of the feature points of the hand such as a color and a shape. The gesture detection module 32 then detects the gesture by the user's hand on the basis of the variation of the image of the hand.

FIG. 4A is a diagram showing an example of the gesture in which a user closes his/her hand. FIG. 4B is a diagram showing an example of the gesture in which a user waves his/her hand laterally.

For example, as illustrated in FIG. 4A, the gesture detection module 32 detects the gesture in which a user closes his/her hand by detecting the reduction of the area of the hand image. As illustrated in FIG. 4B, the gesture detection module 32 detects the gesture in which a user waves his/her hand laterally by detecting that the position of the center of gravity of the image of the hand moves laterally.

The line-of-sight detection module 33 detects the line-of-sight position on the display surface 3 to which the user turns his/her eyes, on the basis of the movement of the user's eyes photographed by the second photographing module 21 (infrared camera 9).

FIG. 5A to FIG. 5D are diagrams for describing the detection of the line-of-sight position by the line-of-sight detection module 33. The detection of the line-of-sight position is described in detail with reference to FIG. 5A to FIG. 5D.

In order to detect the line-of-sight position, photographing by the infrared camera 9 is performed, and infrared light is emitted from the infrared LED 10. When the user turns his/her eyes to the display surface 3, the infrared camera 9 photographs an image including the user's eyes and the infrared light reflected on the eyes (hereinafter referred to as "reflected light").

Figure 5A:
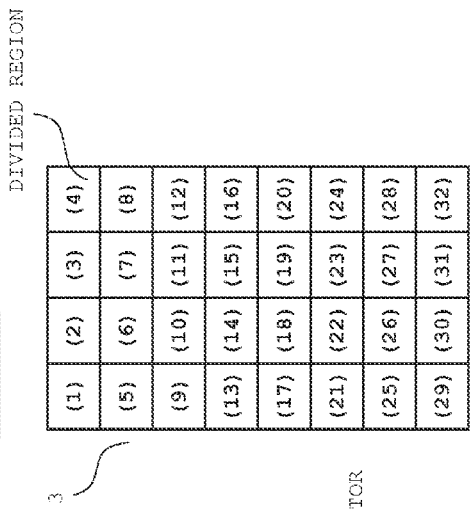
FIG. 5A to FIG. 5D are diagrams for describing the detection of a line-of-sight position by a line-of-sight detection module in an embodiment.

The line-of-sight detection module 33 detects the pupil and the reflected light from the image photographed by the infrared camera 9, and calculates the vector from the center A of the reflected light toward the center B of the pupil (hereinafter referred to as "line-of-sight vector") as illustrated in FIG. 5A. The line-of-sight vector is calculated using a predetermined coordinate system corresponding to the image photographed by the infrared camera 9.

Figure 5B:
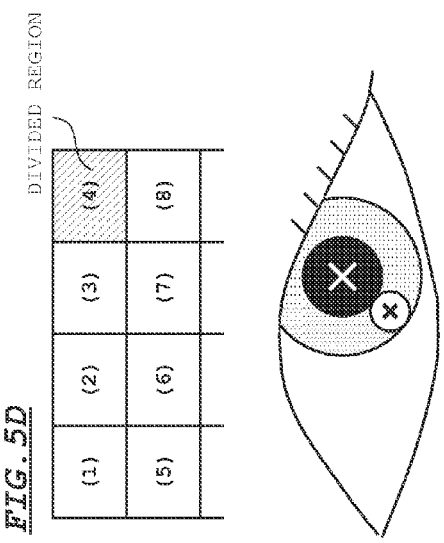

The display surface 3 is divided into a plurality of regions by a grid. As an example, FIG. 5B illustrates the configuration in which the display surface 3 is divided into 32 regions of 8 rows and 4 columns. Each divided region is denoted with each of pieces (1) to (32) of identification information. The storage module 12 stores the information of the coordinates showing the position and size of each divided region in association with each of the pieces of identification information. The number of divided regions and the shapes of the divided regions are not limited to the example of FIG. 5B, but may be set optionally.

Figure 5C:
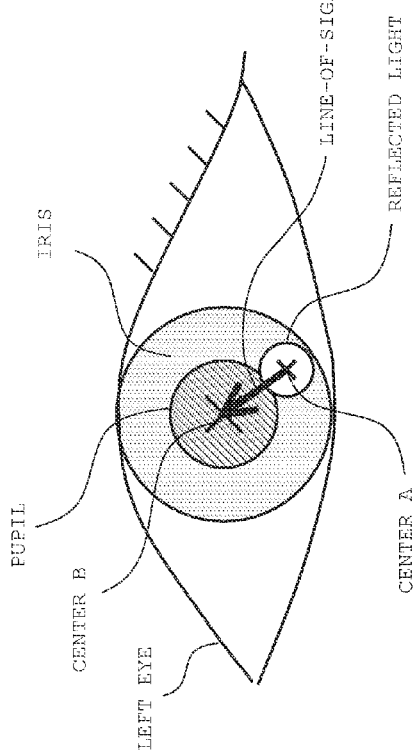
Figure 5D:
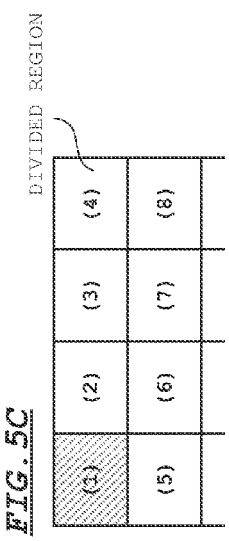

FIG. 5C is a diagram showing the eye movement when the user fixes his/her eyes to the divided region (1) at the left end on the uppermost row. FIG. 5D is a diagram showing the eye movement when the user fixes his/her eyes to the divided region (4) at the right end on the uppermost row. As illustrated in FIG. 5C and FIG. 5D, the positional relationship between the reflected light and the pupil varies and the line-of-sight vector varies in response to the movement of the line of sight of the user.

Calibration processing is performed before a line of sight is input. In the calibration processing, the line of sight of the user is guided to each divided region when the colors of the divided regions sequentially vary to a predetermined color, for example. The line-of-sight vector when the user fixes his/her eyes to each divided region is calculated by the line-of-sight detection module 33, and stored as a reference vector in the storage module 12.

When a line of sight is input, by detecting the reference vector most similar to a line-of-sight vector actually obtained, the line-of-sight detection module 33 determines that the line-of-sight position of the user exists in the divided region corresponding to the reference vector. When no reference vector is similar to the line-of-sight vector actually obtained, the line-of-sight detection module 33 determines that the line-of-sight position of the user is away from the display surface 3.

The determination module 34 determines whether or not the switch condition is satisfied that indicates the difficulty of the reception of the input operation (sound input, line-of-sight input, and gesture input). In other words, in the sound input mode, the determination module 34 determines whether or not the sound volume in the surroundings exceeds a predetermined level. For example, when the volume of the sound input to the microphone 4 exceeds the predetermined level, the determination module 34 determines that the sound volume in the surroundings exceeds the predetermined level. It is preferable to determine that the sound volume in the surroundings exceeds the predetermined level when the sound volume input to the microphone 4 continuously exceeds the predetermined level for a predetermined time, not when temporarily exceed the predetermined level. Through the above-mentioned processing, it is determined whether or not the mobile phone 1 is placed in the situation having a loud ambient noise and hence the sound input is difficult.

Furthermore, in the line-of-sight input mode, the determination module 34 determines whether or not the mobile phone 1 is moving. In other words, the determination module 34 acquires the acceleration applied to the mobile phone 1 from the acceleration detection module 24, and determines whether or not the acquired acceleration exceeds a predetermined value. For example, when the mobile phone 1 carried in a hand is moving, the acceleration applied to the mobile phone 1 exceeds the predetermined value. The determination module 34 also determines whether or not the frequency of the line of sight of the user being given to and released from the display surface 3 exceeds a predetermined frequency. When the mobile phone 1 is moving, the line-of-sight position of the user hardly remains within the display surface 3, and hence the on/off frequency exceeds the predetermined frequency. The determination module 34 may determine whether or not the on/off frequency in a predetermined time exceeds the predetermined frequency. Through the above-mentioned processing, it is determined whether or not the mobile phone 1 is moving and hence the line-of-sight input by the user is difficult.

Furthermore, in the gesture input mode, the determination module 34 determines whether or not the ambient brightness detected by the illuminance detection module 23 is lower than or equal to a predetermined brightness. Through this processing, it is determined whether or not the gesture input is difficult because the surroundings are dark and the user's gesture cannot be accurately photographed by the first photographing module 20.

Furthermore, the determination module 34 determines whether or not the number of false input operations exceeds a predetermined number in the sound input mode, line-of-sight input mode, and gesture input mode. For example, the determination module 34 assumes, as the number of false input operations, the number of operations of returning the processing with the back key 6c, and determines whether or not the number of return operations exceeds the predetermined number. When the input operation in each input mode becomes difficult, the number of false input operations becomes large and hence the number of return operations with the back key 6c—namely, the number of false input operations—is apt to exceed the predetermined number. The determination module 34 may determine whether or not the number of false input operations in a predetermined time exceeds the predetermined number.

The switch control module 35 switches the present input mode to another input mode when the determination module 34 determines that the above-mentioned switch condition is satisfied. For example, when the present input mode is the sound input mode, the switch control module 35 switches the sound input mode to the line-of-sight input mode or gesture input mode.

Figure 7:
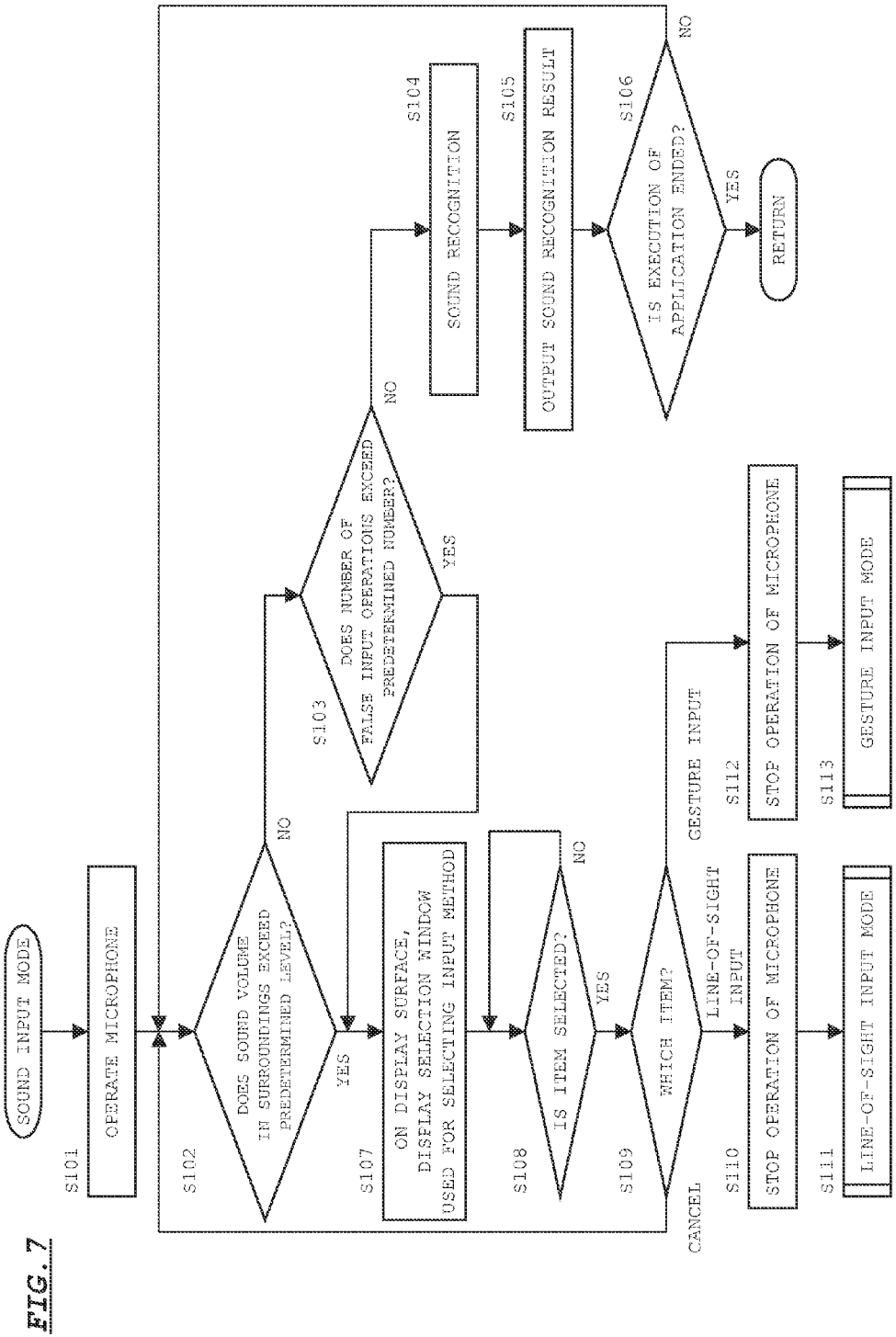
FIG. 7 is a flowchart showing the processing of sound input mode included in the input operation receiving processing in an embodiment.

FIG. 6 is a flowchart showing an input operation receiving processing. FIG. 7 is a flowchart showing the processing of the sound input mode included in the input operation receiving processing. FIG. 8 is a flowchart showing the processing of the line-of-sight input mode included in the input operation receiving processing. FIG. 9 is a flowchart showing the processing of the gesture input mode included in the input operation receiving processing.

Hereinafter, the input operation receiving processing is described with reference to FIG. 6 to FIG. 9. When any application is started, the input operation receiving processing is started.

The control module 11 refers to the correspondence table 12a illustrated in FIG. 3, and determines the input method associated with the started application (S11). For example, when the application for sound recognition is started, the associated input method is the sound input. Therefore, the control module 11 executes the processing in the sound input mode (S12). For example, when the application of an electronic book is started, the associated input method is the line-of-sight input. Therefore, the control module 11 executes the processing in the line-of-sight input mode (S13). For example, when the application of a gallery is started, the associated input method is the gesture input. Therefore, the control module 11 executes the processing in the gesture input mode (S14).

The processing in the sound input mode is described with reference to FIG. 7. When the processing in the sound input mode is started, the control module 11 operates the microphone 4 (S101). A user's voice and the sounds in the surroundings are input to the control module 11 via the microphone 4.

The determination module 34 determines whether or not the sound volume in the surroundings exceeds the predetermined level, and whether or not the number of false input operations exceeds the predetermined number (S102 and S103).

In the case where the sound volume in the surroundings does not exceed the predetermined level (S102: NO) and the number of false input operations does not exceed the predetermined number (S103: NO), when a user's voice for an input operation is input to the microphone 4, the sound recognition module 31 executes the sound recognition processing (S104) and outputs the sound recognition result, namely text information corresponding to the input voice (S105).

The control module 11 executes a predetermined function assigned to the text information output from the sound recognition module 31. For example, when a function of starting a specific application is assigned to the text information, the control module 11 starts the application. For example, the application of the email is started based on the voice "mail".

When the execution of the application of the sound recognition is not ended (S106: NO), the processes from step S102 to step S106 are repeated.

When the sound input is difficult, for example, because the mobile phone 1 is used in a place having a loud ambient noise, the determination module 34 determines that the sound volume in the surroundings exceeds the predetermined level (S102: YES). Alternatively, the determination module 34 determines that the number of false input operations exceeds the predetermined number (S103: YES). In this case, the switch control module 35 displays a selection window 110, which is used for selecting an input mode after the switch, in an overlap manner on a screen already displayed on the display surface 3 (S107).

FIG. 10A is a diagram showing the selection window 110 displayed on the display surface 3 in the sound input mode. The selection window 110 includes a message 111 for encouraging the switch of the input method. The selection window 110 further includes three selection objects 112 used for selecting any of the items "line-of-sight input", "gesture input", and "cancel". In a pictograph region on the screen displayed on the display surface 3, an icon 113 for notifying the user that the present input method is the sound input is displayed.

The user performs a touch input operation—for example, a tap operation—on a desired selection object 112. When any item is selected (S108: YES), the switch control module 35 determines which item is selected (S109).

Upon determining that the item "line-of-sight input" is selected (S109: line-of-sight input), the switch control module 35 stops the operation of the microphone 4 (S110), and switches the input mode from the sound input mode to the line-of-sight input mode (S111). Upon determining that the item "gesture input" is selected (S109: gesture input), the switch control module 35 stops the operation of the microphone 4 (S112), and switches the input mode from the sound input mode to the gesture input mode (S113).

For example, when the user moves to a place having a low noise and restarts the sound input, the user selects the item "cancel" after moving. Upon determining that the item "cancel" is selected (S109: cancel), the switch control module 35 returns to the process of the step S102.

Next, the processing in the line-of-sight input mode is described with reference to FIG. 8. When the processing in the line-of-sight input mode is started, the control module 11 operates the infrared camera 9 and infrared LED 10 (S201). A photographed image including the user's eyes and the reflected light is input to the control module 11.

The determination module 34 determines whether or not the acceleration applied to the mobile phone 1 exceeds the predetermined value, whether or not the frequency of the line of sight of the user getting on and off the display surface 3 exceeds the predetermined frequency, and whether or not the number of false input operations exceeds the predetermined number (S202, S203, and S204).

When the acceleration applied to the mobile phone 1 does not exceed the predetermined value (S202: NO), the frequency of the line of sight of the user getting on and off the display surface 3 does not exceed the predetermined frequency (S203: NO), and the number of false input operations does not exceed the predetermined number (S204: NO), the line-of-sight detection module 33 detects in which divided region on the display surface 3 the line-of-sight position of the user exists (S205), and outputs the detection result of the line-of-sight position, namely the identification information attached to the divided region to which the user fixes his/her eyes (S206).

The control module 11 executes a predetermined function assigned to the divided region detected by the line-of-sight detection module 33. For example, when a function of turning a page of the electronic book, which is displayed on the display surface 3 by the application of the electronic book, is assigned to the divided region to which the user fixes his/her eyes, the control module 11 makes the next page be displayed on the display surface 3.

When the execution of the application of the electronic book is not ended (S207: NO), the processes from step S202 to step S207 are repeated.

When the mobile phone 1 carried by the user's hand is apt to move and hence the line-of-sight input becomes difficult, the determination module 34 determines that the acceleration applied to the mobile phone 1 exceeds the predetermined value (S202: YES). Alternatively, the determination module 34 determines that the frequency of the line of sight of the user getting on and off the display surface 3 exceeds the predetermined frequency (S203: YES). Alternatively, the determination module 34 determines that the number of false input operations exceeds the predetermined number (S204: YES). In this case, the switch control module 35 displays a selection window 114 in an overlap manner on a screen already displayed on the display surface 3 (S208).

FIG. 10B is a diagram showing the selection window 114 displayed on the display surface 3 in the line-of-sight input mode. The selection window 114 includes a message 115 for encouraging the switch of the input method, and three selection objects 116 used for selecting any of the items "sound input", "gesture input", and "cancel". In the pictograph region on the screen displayed on the display surface 3, an icon 117 for notifying the user that the present input method is the line-of-sight input is displayed.

When any item is selected (S209: YES), the switch control module 35 determines which item is selected (S210). Upon determining that the item "sound input" is selected (S210: sound input), the switch control module 35 stops the operation of the infrared camera 9 and infrared LED 10 (S211), and switches the input mode from the line-of-sight input mode to the sound input mode (S212). Upon determining that the item "gesture input" is selected (S210: gesture input), the switch control module 35 stops the operation of the infrared camera 9 and infrared LED 10 (S213), and switches the input mode from the line-of-sight input mode to the gesture input mode (S214). Upon determining that the item "cancel" is selected (S210: cancel), the switch control module 35 returns to the process of the step S202.

The processing in the gesture input mode is described with reference to FIG. 9. When the processing in the gesture input mode is started, the control module 11 operates the camera 8 (S301). When the user performs a gesture with his/her hand in front of the display surface 3, a photographed image including the image of the hand is input to the control module 11.

The determination module 34 determines whether or not the ambient brightness is lower than or equal to the predetermined brightness, and whether or not the number of false input operations exceeds the predetermined number (S302 and S303).

When the ambient brightness is higher than the predetermined brightness (S302: NO) and the number of false input operations does not exceed the predetermined number (S303: NO), the gesture detection module 32 detects the gesture performed by the user (S304), and outputs the detection result, namely information corresponding to the detected gesture (S305).

The control module 11 executes a predetermined function assigned to the gesture detected by the gesture detection module 32. For example, when the gesture in which the user waves his/her hand is detected, and a function of scrolling the list screen of thumbnail images is assigned to the gesture, the control module 11 scrolls the list screen in a hand waving direction. Here, the list screen is displayed on the display surface 3 by the application of a gallery.

When the execution of the application of the gallery is not ended (S306: NO), the processes from step S302 to step S306 are repeated.

When the surroundings become so dark that the gesture by the user cannot be accurately photographed by the camera 8, and the gesture input becomes difficult, the determination module 34 determines that the ambient brightness becomes lower than or equal to the predetermined brightness (S302: YES). Alternatively, the determination module 34 determines that the number of false input operations exceeds the predetermined number (S303: YES). In this case, the switch control module 35 displays a selection window 118 in an overlap manner on a screen already displayed on the display surface 3 (S307).

FIG. 10C is a diagram showing the selection window 118 displayed on the display surface 3 in the gesture input mode. The selection window 118 includes a message 119 for encouraging the switch of the input method, and three selection objects 120 used for selecting any of the items "sound input", "line-of-sight input", and "cancel". In the pictograph region on the screen displayed on the display surface 3, an icon 121 for notifying the user that the present input method is the gesture input is displayed.

When any item is selected (S308: YES), the switch control module 35 determines which item is selected (S309). Upon determining that the item "sound input" is selected (S309: sound input), the switch control module 35 stops the operation of the camera 8 (S310), and switches the input mode from the gesture input mode to the sound input mode (S311). Upon determining that the item "line-of-sight input" is selected (S309: line-of-sight input), the switch control module 35 stops the operation of the camera 8 (S312) and switches the input mode from the gesture input mode to the line-of-sight input mode (S313). Upon determining that the item "cancel" is selected (S309: cancel), the switch control module 35 returns to the process of the step S302.

When the application corresponding to the touch input is started, the touch input mode is executed, and the touch detection module 14 and the control module 11 receive a touch input operation (not illustrated in the flowchart of FIG. 6).

In the present embodiment, thus, it is automatically determined whether or not the reception of the present input operation is difficult, and, based on the determination, the present input mode can be switched to another input mode of a different input method.

Specifically, when it is determined in the sound input mode that the difficulty of the reception of the sound input is caused by a factor such as a situation having a loud ambient noise, based on the determination, the sound input mode can be switched to the line-of-sight input mode or gesture input mode. When it is determined in the line-of-sight input mode that the difficulty of the reception of the line-of-sight input is caused by a factor such as a moving state of the mobile phone 1, based on the determination, the line-of-sight input mode can be switched to the sound input mode or gesture input mode. Furthermore, when it is determined in the gesture input mode that the difficulty of the reception of the gesture input is caused by a factor such as dark surroundings, based on the determination, the gesture input mode can be switched to the sound input mode or line-of-sight input mode.

Thus, the difficulty of the user's input operation caused by the surrounding environment or situation can be suppressed.

In the present embodiment, when the input mode is switched, the user can select a desired input mode from two other input modes.

In the present embodiment, when the switch of the input mode is not required, the user can suspend the switch by performing a refusing operation.

<Others>

An embodiment of the present disclosure has been described, but the present disclosure is not limited to this embodiment. An embodiment of the present disclosure can be modified variously.

In an embodiment, for example, when the selection objects 112, 116, and 120 of "cancel" in the selection windows 110, 114, and 118 are selected, the switch of the input mode is suspended. However, a configuration may be employed where the selection objects 112, 116, and 120 of "cancel" are not disposed and the input mode cannot be suspended.

Furthermore, in an embodiment, the selection windows 110, 114, and 118 are displayed, and the present input mode is switched to the input mode selected in the selection windows 110, 114, and 118. However, a configuration may be employed where the selection windows 110, 114, and 118 are not displayed and the present input mode is switched to a previously determined input mode.

Furthermore, information (table) that associates the applications with the input methods (input modes) applicable to the respective applications may be stored in the storage module 12. In this case, when the present input method is difficult to operate, an input method applicable to the currently executed application is displayed as a switch candidate on the selection windows 110, 114, and 118.

When a selection operation is not performed for a predetermined time after the selection windows 110, 114, and 118 are displayed on the display surface 3, the selection windows 110, 114, and 118 may be closed and the present input mode may be continued. In such a configuration, the selection objects 112, 116, and 120 of "cancel" do not need to be disposed on the selection windows 110, 114, and 118.

Furthermore, in an embodiment, a selection object of "touch input" may be disposed in the selection windows 110, 114, and 118. In this case, when the selection object of "touch input" is selected, the present input mode is switched to the touch input mode.

Furthermore, in an embodiment, the mobile phone 1 can receive four input operations of different input methods.

However, the mobile phone 1 solely needs to receive at least two input operations. When the reception of one input operation becomes difficult, the input mode of receiving the one input operation solely needs to be switched to the input mode of receiving the other input operation.

The present disclosure is not limited to the mobile phone, but may be applied to various kinds of mobile terminal devices such as a PDA (Personal Digital Assistant), a tablet PC, and an electronic book terminal.

Embodiments of the disclosure may be modified in various ways as necessary within the technical scope of the claims.

What is claimed is:

1. A mobile terminal device comprising:
   a first input apparatus configured to receive input operations via a first input method;
   a second input apparatus configured to receive input operations via a second input method that is different than the first input method; and
   at least one processor configured to
      receive a refusal operation, and
      while input operations are being received by the first input apparatus via the first input method, determine when reception of input operations via the first input method has become difficult by determining that the refusal operation has not been received, and,
      when receiving input operations via the first input method is determined to have become difficult, start operation of the second input apparatus to begin receiving input operations via the second input method, and stop operation of the first input apparatus to stop receiving input operations via the first input method.

2. The mobile terminal device according to claim 1, wherein the first input method comprises sound recognition, wherein the first input apparatus comprises a microphone and converts sound, received via the microphone, into text, and wherein determining when reception of input operations via the first input method has become difficult comprises determining when a volume of ambient sound, received via the microphone, exceeds a predetermined level.

3. The mobile terminal device according to claim 1, wherein the first input method comprises gesture detection, wherein the first input apparatus comprises a camera and detects a gesture based on an image photographed by the camera, and wherein determining when reception of input operations via the first input method has become difficult comprises determining when an ambient brightness is lower than or equal to a predetermined brightness.

4. The mobile terminal device according to claim 1, further comprising a display, wherein the first input method comprises line-of-sight detection, wherein the first input apparatus comprises a camera and detects a position on the display corresponding to a line of sight of a user based on eyes of the user photographed by the camera, and wherein determining when reception of input operations via the first input method has become difficult comprises determining if the mobile terminal device is moving.

5. The mobile terminal device according to claim 1, wherein determining when reception of input operations via the first input method has become difficult comprises determining when a number of false input operations exceeds a predetermined number.

6. A mobile terminal device comprising:
   a first input apparatus configured to receive input operations via a first input method;
   a second input apparatus configured to receive input operations via a second input method that is different than the first input method;
   a third input apparatus configured to receive input operations via a third input method that is different than both the first input method and the second input method, and
   at least one processor configured to
      while input operations are being received by the first input apparatus via the first input method, determine when reception of input operations via the first input method has become difficult, and,
      when receiving input operations via the first input method is determined to have become difficult:
         receive a user operation that indicates an input method to be used;
         when the user operation indicates the second input method, start operation of the second input apparatus to begin receiving input operations via the second input method;
         when the user operation indicates the third input method, start operation of the third input apparatus to begin receiving input operations via the third input method; and
         stop operation of the first input apparatus to stop receiving operations via the first input method.

7. The mobile terminal device according to claim 6, wherein the first input method comprises sound recognition, wherein the first input apparatus comprises a microphone and converts sound, received via the microphone, into text, and wherein determining when reception of input operations via the first input method has become difficult comprises determining when a volume of ambient sound, received via the microphone, exceeds a predetermined level.

8. The mobile terminal device according to claim 6, wherein the first input method comprises gesture detection, wherein the first input apparatus comprises a camera and detects a gesture based on an image photographed by the camera, and wherein determining when reception of input operations via the first input method has become difficult comprises determining when an ambient brightness is lower than or equal to a predetermined brightness.

9. The mobile terminal device according to claim 6, further comprising a display, wherein the first input method comprises line-of-sight detection, wherein the first input apparatus comprises a camera and detects a position on the display corresponding to a line of sight of a user based on eyes of the user photographed by the camera, and wherein determining when reception of input operations via the first input method has become difficult comprises determining if the mobile terminal device is moving.

10. The mobile terminal device according to claim 6, wherein determining when reception of input operations via the first input method has become difficult comprises determining when a number of false input operations exceeds a predetermined number.

11. An input operation receiving method comprising:
    while input operations are being received by a first input apparatus, configured to receive input operations via a first input method and receive a refusal operation, determining when reception of input operations via the first input method has become difficult by determining that the refusal operation has not been received; and
    when receiving input operations via the first input method is determined to have become difficult,
       starting operation of a second input apparatus, configured to receive input operations via a second input method that is different than the first input method, to begin receiving input operations via the second input method, and stopping operation of the first input apparatus to stop receiving input operations via the first input method.

12. The method according to claim 11, wherein determining when reception of input operations via the first input method has become difficult comprises determining when a volume of ambient sound, received via a microphone, exceeds a predetermined level.

13. The method according to claim 11, wherein determining when reception of input operations via the first input method has become difficult comprises determining when an ambient brightness is lower than or equal to a predetermined brightness.

14. The method according to claim 11, wherein determining when reception of input operations via the first input method has become difficult comprises determining if the first input apparatus is moving.

15. The method according to claim 11, wherein determining when reception of input operations via the first input method has become difficult comprises determining when a number of false input operations exceeds a predetermined number.

* * * * *